United States Patent

[11] 3,623,002

[72] Inventors David W. Mayne
San Juan Capistrano;
Alan K. Jennings, Anaheim, both of Calif.

[21] Appl. No. 968
[22] Filed Jan. 6, 1970
[45] Patented Nov. 23, 1971
[73] Assignee Peripheral Business Equipment, Inc.

[54] DATA-POOLING CIRCUITS
12 Claims, 6 Drawing Figs.

[52] U.S. Cl. .......... 340/172.5
[51] Int. Cl. .......... H04l 5/00, G06F 7/00
[50] Field of Search .......... 340/172.5

[56] References Cited

UNITED STATES PATENTS

| | | | |
|---|---|---|---|
| 3,336,582 | 8/1967 | Beausoleil | 340/172.5 |
| 3,340,516 | 9/1967 | Harbour | 340/172.5 |
| 3,456,242 | 7/1969 | Lubkin et al. | 340/172.5 |

*Primary Examiner*—Gareth D. Shaw
*Assistant Examiner*—R. F. Chapuran
*Attorney*—Fraser and Bogucki

ABSTRACT: Modular pooling circuits for transferring data Blocks are provided that can be serially coupled in variable length chains of substantially indefinite capacity and provide automatic queuing of the data blocks. To utilize data characters provided in parallel form from a data unit, and to enter these into the pooling chain, each pooling circuit module includes a bidirectional parallel-to-serial converter circuit, a pair of signal repeaters for transferring command and data signals along the chain, and priority selection and signal-switching circuits. Each pooling circuit generates signals at selected frequencies for the command data signals. Each circuit also operates in a repeater mode for both command and data signals treansferred along the chain, until the associated data unit has available data and the pooling circuit occupies the highest position that is requesting priority in the chain. Data and command signals that are transferred along the chain are reconstituted, as to timing and waveform, but otherwise transferred without modification. When locally initiated data and command signals are transferred, lower priority units are effectively disconnected from the chain, and higher priority units are effectively disabled until the transfer is complete.

INVENTORS
DAVID W. MAYNE
ALAN K. JENNINGS
BY
Fraser and Bogucki
ATTORNEYS

INVENTORS
DAVID W. MAYNE
ALAN K. JENNINGS

BY *Fraser and Bogucki*

ATTORNEYS

INVENTORS
DAVID W. MAYNE
ALAN K. JENNINGS
BY
Fraser and Bogucki
ATTORNEYS

INVENTORS
DAVID W. MAYNE
ALAN K. JENNINGS
BY
Fraser and Bogucki
ATTORNEYS

PATENTED NOV 23 1971 3,623,002

INVENTORS
DAVID W. MAYNE
ALAN K. JENNINGS
BY
Fraser and Bogucki
ATTORNEYS

INVENTORS
DAVID W. MAYNE
ALAN K. JENNINGS
BY
Fraser and Bogucki
ATTORNEYS

DATA-POOLING CIRCUITS

BACKGROUND OF THE INVENTION

1. Field of the Invention

This invention relates to data-processing circuits and more particularly to systems for combining asynchronously prepared data input records into a form suitable for further processing.

2. History of the Prior Art

In a concurrently filed application entitled "INPUT DATA PREPARATION SYSTEM," filed Jan. 6, 1970, Ser. No. 951, and assigned to the assignee of the present invention, an input data preparation system based on modular units is described that has particular advantages in cost and versatility. A variable number of stations are permitted to feed data in orderly form to a single low-cost storage or data-processing unit, with the individual operators being nevertheless available to provide different functions and to operate in different modes. An aspect of this system is that the need for a large central controller to accommodate a number of input stations is avoided by using a serial chain of pooling circuit modules, one associated with each of the data input units. Such a system in turn imposes substantial requirements on the pooling circuit modules, which must transfer data and command signals along the pooling circuit chain, as well as providing data to and receiving data from the associated data input units in parallel form. At the same time, the capability of the system for operating in long length as well as short length chains, and for providing bidirectional command as well as data signals within the system should not be impeded.

The expedient of utilizing sets of parallel data and command signal transmission lines, one set for each direction of transmission, and one line for each different command signal, is deemed obvious. Such an arrangement has the obvious disadvantages of requiring extensive signal-processing equipment for each channel while not resolving the problem of making it possible to utilize pooling chains of variable length without loss of signal reliability.

SUMMARY OF THE INVENTION

The objects and purposes of the present invention are achieved by digital pooling circuits that convert data transferred between a pooling circuit and its associated data input unit from parallel to serial form, and vice versa, and separately transfer both command and data signals along the pooling chain bidirectionally in rectangular waveforms of selected RF frequencies. Each pooling circuit includes a pair of signal repeaters, each operable in a different direction of transmission, and connected to RF signal intercouplings to higher and lower priority units. The repeaters include local frequency generators and a stable timing reference circuit, arranged with detection and gating circuits such that both command signal portions and data portions are fully reconstituted, with the command signal portions being interspersed within the data portions. The command signals are utilized in priority selection circuits to determine whether signals are transferred further along the chain or whether the locally associated data unit has gained priority. The bidirectional transmission of rectangular waveforms, together with the use of reconstituted signals, provides a combination of optimum data reliability and essential freedom from any limitation upon pooling chain length.

BRIEF DESCRIPTION OF THE DRAWINGS

A better understanding of the invention may be had from the following description, taken in conjunction with the accompanying drawings, in which.

DETAILED DESCRIPTION

Figure 1:
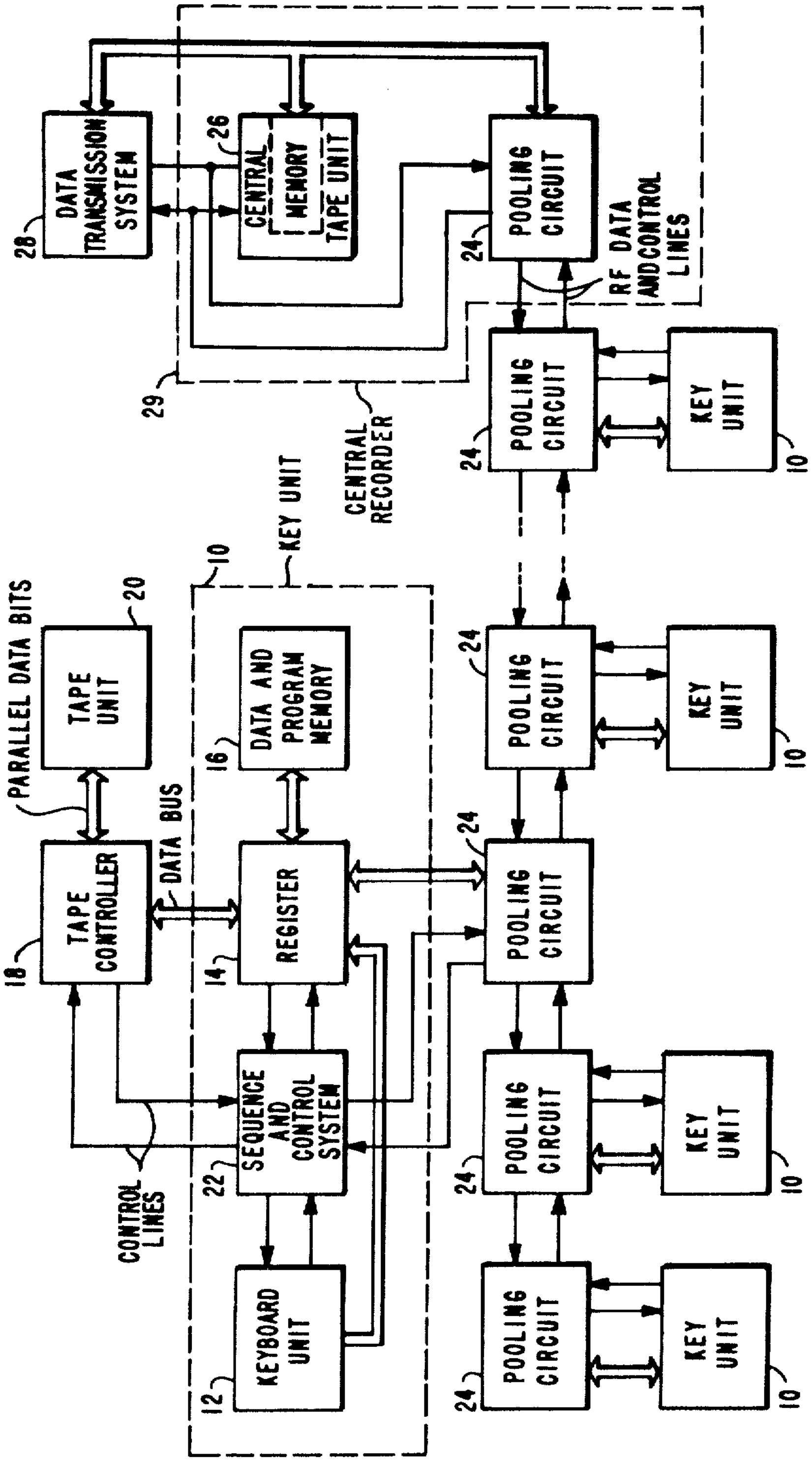
FIG. 1 is a block diagram of the principal elements of an illustrative system utilizing a number of input data preparation systems.

An input data preparation system in accordance with the invention that illustrates the flexibility and versatility of such systems is shown in block diagram form in FIG. 1. Data blocks are generated asynchronously at keyboards within separate key units 10, which are of like modular construction. One key unit 10 is shown in some further detail, and each of the remaining key units should be understood to incorporate like functional subsystems and interconnections. The operator actuates a keyboard unit 12 having a data bus comprising parallel bit lines (illustrated by a dual line interconnection) coupled to a character register 14 which in turn couples the character, still in the form of parallel data bits, into a data and program memory 16. The memory 16 has a length determined by the maximum number of characters desired for a given record, here chosen as 200. As is described in greater detail below, the number of characters in the record may be programmed to any length, although it is assumed that a minimum block of 20 characters is employed inasmuch as existing computer standards generally require this minimum. Data transfer from the memory 16 takes place through the register 14 to and from either of two external data bus connections in this example. If the key unit 10 is to be employed alone with a data-recording system, such as a digital magnetic tape recorder, one data bus from the register 14 is coupled through a tape controller 18 to a digital magnetic tape unit 20. These units 18, 20 may be conventional commercially available units that provide tape loading, including load point sensing; format control, such as the inclusion of appropriate start and stop delays and gap writing; bit synchronization, and error checking. Other types of data-recording systems, particularly disk systems, might alternatively be employed, but in any event the internal functioning of these systems in responding to data and commands is well understood and need not be further elaborated.

The key unit also includes a sequence and control system 22, described in further detail below, and incorporating the internal functions that are widely employed in existing input data preparation systems. While these internal functions will not be described in detail in order to simplify and shorten the specification, it should be understood that the data and program memory 16 incorporates changeable program instructions for each character position, there generally being two complete programs to define the field and particular operations (such as skipping and duplicating) to be provided within those fields, as well as numeric and alphabetic instructions. The existence of errors such as impermissible characters is indicated to the operator on a suitable display. Although only two control lines are shown as intercoupling the sequence and control system 22 to the various units, this is to be understood as merely a symbolic representation, because the actual number of lines is determined in each instance by the available switches and control keys that determine the selected modes and the various control functions.

In the operation of the key unit 10 as a separate input station, the unit cooperates only with the tape controller 18 and the tape unit 20. The sequence and control system 22 provides enabling signals first to permit transfer, under appropriate program control, of asynchronously generated data from the keyboard, on a character-by-character basis, through the register 14 into the appropriate positions of the memory 16. When a data block has been entered in the memory 16, the sequence and control circuits 22 then enable the output transfer of the data block on a synchronous high-speed basis into the tape recorder system. The data bits remain in parallel at all times during these transfers. In addition, it is desirable to check the accuracy of the recording on the record member, and this is accomplished by sequencing the tape controller 18 and the tape unit 20, in conventional fashion, to reverse back to the start of the data block and to reread the data block so as to make a character-by-character comparison to the contents of the block that is still in the memory 16, after which the recorder system is released and the keyboard unit 12 is again enabled, in order to accept another operator-generated record.

The sequence and control system 22 also incorporates means, selectable by operator switches, for alternately enabling keyboard entry and pooling operations, and for enabling the keyboard system 12 and the tape unit 20 to effect merge and verify functions. Cooperation with a plurality of pooling circuits 24, each associated with a different key unit 10 or other input data preparation system, permits each data preparation system to be utilized on line with a single central tape unit 26 or alternatively with a data transmission system 28. The central tape unit 26 is again chosen by way of example as a digital magnetic tape recorder, incorporating a data block memory, means for generating a pooling enable signal, and a tape controller system. Together with its pooling circuit 20, the central tape unit 26 forms what may be called a central recorder 29. The digital magnetic tape system in the central recorder 29 is chosen to be a higher performance unit than the tape unit 20. In the practical example being described, the central recorder has a nominal operating speed of 25 IPS in comparison to a nominal operating speed of 12.5 IPS for the unit 20, with correspondingly faster start and stop times. Consequently, the central tape unit 26 is a more costly unit, but only a single such unit need be employed for a substantial pooling chain. A data transmission system 28 is shown as coupled in parallel with the central recorder 29 although of course the units will generally be operated separately. Although the central recorder 29 and the data transmission system 28 may receive the data directly from the pooling circuit intercouplings, the use of a parallel line data bus, as shown, is more conventional and is suitable for a wide variety of commercially available systems. The data transmission system 28 also incorporates a memory for receiving a data block and returning the received error block back to the transmitting data input preparation system for error checking, and may be any commercially available unit that incorporates means for generation of a suitable transmission code, including error checking bits, and synchronization of output data at a selected conventional data rate.

The pooling circuits 24 couple to the data bus of an associated station, but also provide bidirectional data and command signal transfer along individual RF lines, one used for each direction of serial transfer along the pooling circuits 24. Separate command signals are transferred on control lines to and from the key units 10, and the pooling circuits 24 unite the data command signals into variable frequency sequences on the RF lines. When data is being transferred along the chain from a different unit of lower priority, each pooling circuit functions as as bidirectional repeater, but when the pooling circuit 24 is transferring data from its own associated input data preparation system, all lower priority units are disconnected.

Systems in accordance with the invention are thus arranged to initiate "request" signals and respond to "select" signals within each individual input data preparation system, such as a key unit 10, but the function of priority selection is primarily determined within the pooling circuits 24. Consequently, the functioning of the pooling chain is independent of the units incorporated in it and the chain may be lengthened or shortened, and the units intermixed, to achieve the most efficient manner of accomplishing a given data preparation problem. In the example shown, the particular key unit 10 that is illustrated in greater detail and associated with the tape unit 20 is here assumed to be operating to verify data previously recorded by separate operator in the tape unit 20. Each of the operators controlling the other key units 10 is entering data on the keyboard. As each data record is made available to the pooling chain, it is selected for transfer into the central recorder 29 and the particular unit is thereafter released as soon as the echo-type comparison reveals that the transfer was effected correctly. In carrying out the verify operation, the record from the tape unit 20 is entered in the memory 16, and the operator at the keyboard 12 attempts to prepare the same record. As each character is entered, a comparison is made to the corresponding character position in the memory 16 and when the entire record has been completed without error, the stored data block is then available for release to the central recorder 29. In each instance of transfer of a data block, whether for entry into the memory of the recorder system or return for error checking, the transfer is synchronous and at a high transfer rate so that records and not characters are time shared on the pooling system, and many data records may be transferred while an operator is preparing a single such record.

It should particularly be appreciated that although preparation of a record (or output transfer through a data transmission system) assumes the existence of some sort of output device, that the tape unit 20 arranged with the key unit 10 can also be utilized as a low cost central recorder. By way of example, although many other variations are feasible as will be evident from the subsequent description, the pooling circuit chain may be broken between the three lowest priority units and the remaining higher priority units. In such event, the key unit 10 having the coupled tape controller 18 and tape unit 20 constitutes the highest priority unit, and it is switched to operate as a central recorder, with its own keyboard unit 12 being disabled, while the sequence and control system 22 provides enabling signals to enable transfer of data blocks into the memory 16, retransmission of the data blocks back into the pooling chain for comparison purposes, and then output transfer of the stored data block to the tape unit 20 followed by rereading for error checking purposes if desired. Despite the lower performance characteristics of the tape unit 20 acceptable operator delay times for chains of moderate length (three to five units) are achieved within this system.

Consequently, if there is a malfunction in an overall system, a change in the nature of the job to be performed, a change in personnel or a need to perform various functions or work under different program controls, the input data preparation supervisor can distribute operators and machines with virtually complete freedom as individual units, short or long pooling chains, while in each instance approaching the optimum in cost savings.

Figure 2:
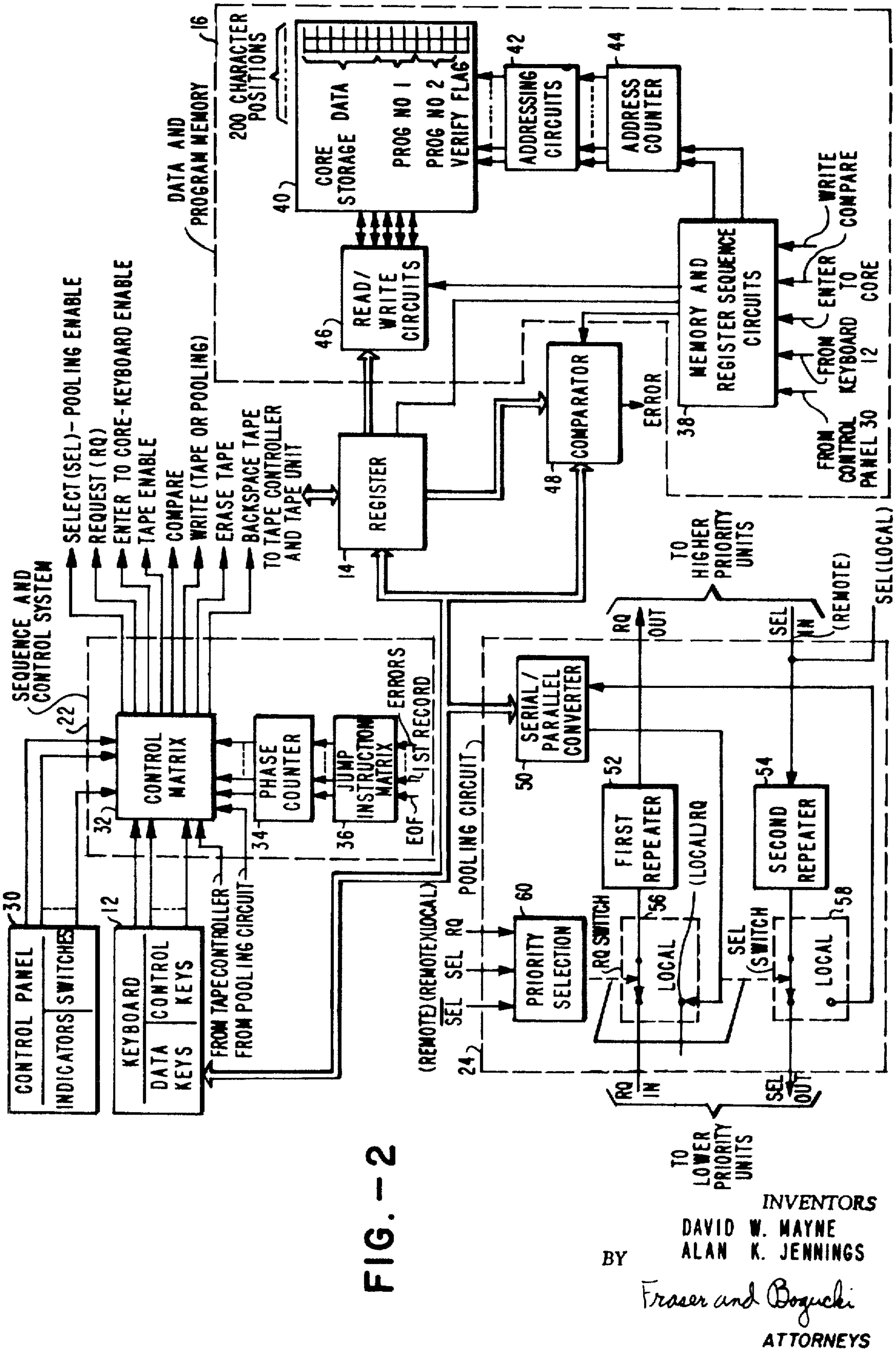
FIG. 2 is a more detailed block diagram of an input data preparation system and associated pooling circuit that may be employed in the arrangement of FIG. 1.

The block diagram of FIG. 2 depicts further details of the key unit 10 and pooling circuit 24 of FIG. 1. In addition to the keyboard unit 12, the system also includes a control panel 30, as is typical of systems of this type. The indicator portion of the control panel 30 provides indications of the characters as they are entered, the character position and various other data useful in the speedy preparation of a record. For brevity, further detail as to the indicators and displays has been omitted inasmuch as these may be conventional displays of the types now used. The control panel switches largely control program selection, system function (data entry, merge and verify), and system status (whether the system is being used offline with a single recorder or in a pooling chain, or as the recorder unit for a pooling chain). These mode and function switches provide control signals, along with the control key signals from the keyboard unit 12, to a control matrix 32 within the sequence and control system 22. The control matrix 32 also receives signals as to status from the tape controller and from the pooling circuits and is functionally controlled in subsequences by a phase counter 34 which cooperates with the control matrix 32 and a jump instruction matrix 36 so as to generate the controlled programs desired within the data entry sequence, particularly program control, error checking, the skip/dup function and graphical display. Even though the practical embodiment of the invention now being described incorporates advantageous features for these purposes, and provides additional functions, implementation of the skip, dup, error checking and other basic functions desired for data entry may correspond to systems now in use, and is therefore not included herein. A number of signals that are useful in the modular and interchangeable aspects of systems in accordance with the invention, however, are shown for identification, and these comprise the following:

1. The select (SEL) signal is generated by the control matrix to enable pooling when the key unit 10 is being used in the recorder mode.

2. The request (RQ) signal is generated when the system is operating on line, to indicate that a data block is available during transfer into the pooling chain.

3. An enter to core or keyboard enable signal is provided for character-by-character asynchronous entry and for locking up the keyboard.

4. A tape enable signal is provided to the tape controller to initiate tape motion. Only one of the enabling signals is being provided at a time, and depending upon online or offline operation the system switches between pooling enable and tape enable or between keyboard enable and pooling enable.

5. A compare signal is provided to govern the comparison function used in the verify mode, in reading after writing from the tape unit, and in comparing a received data block to the originally transmitted data block.

6. The write signal, provided during transfer to tape or the pooling chain, effects the synchronous output of a data block to the appropriately designated unit.

7. An erase tape signal actuates the tape controller to reverse one data block and to erase the previously recorded block for entry of a new block.

8. The backspace tape signal is provided to the tape controller to return to the start of a data block for the rereading and error checking function.

These signals can actually be generated in straightforward sequences by stepping switches, but modern digital design techniques permit considerable consolidation of functions given the desired modes and general operating phases. The specific arrangement of a matrix to generate these signals is accomplished with considerable attention to the avoidance of redundant circuits, in conjunction with the circuits for performing the remainder of the data preparation functions. Inasmuch as so many alternatives are available, and inasmuch as only straightforward combinations of logical gating circuits are required for the specified signals to be generated, no specific example of the sequence and control system 22 is provided. Further specific information is included here, however, in conjunction with the subsequent figures in the drawings.

The data and program memory 16 cooperates with the register 14 under control of sequence circuits 38 which receive various command signals from the control matrix 32, as well as control signals from the switches of the control panel 30 and the control keys of the keyboard 12. Again, the bulk of the detailed functions are concerned with details of data preparation, and these are merely indicated generally for clarity. The write, compare and enter to core signals initiate repetitive sequences of the types commonly employed with random access memories. The register 14 transfers each character to be written into the memory 16 as well as each character read out of the memory, by appropriate coupling to the different associated units. Although separate data busses are shown to depict data flow, only a single data bus need be provided into and out of the register 14, with the appropriate input and output transfer units being enabled at the appropriate times by the control circuits.

The data and program memory 16 principally comprises a core storage 40 having a selected number (here 200) of character positions, with each character position, as shown for two of the positions, comprising a 13-bit word. Six bits are utilized for a data character, three bits each for two different program instructions, and the 13the bit being a flag bit utilized in the verify function. Addressing circuits 42 under control of an address counter 44 serially shift the core storage for operation of the read-write circuits 46 to transfer data characters into and out of the resister 14. The sequencing through successive fields is continuous, although it will be understood that normal reversal sequences are employed in the event that errors are detected in the data entry or verify modes. A comparator 48 coupled to the register 14 receives successive characters in the data block either from the keyboard 12 as generated during a verify operation, or from the pooling circuit 24 when a block of data is retransmitted back to the key unit 10. The remaining set of inputs of the comparator 48 receive successive data bits on the data bus from the register 14 for character-by-character comparison and indication of error if such exists.

Therefore, within the key unit 10, including the output transfer lines to the tape controller and tape unit or to the pooling circuit, each data character is in parallel by bit form. When operating in the central recorder mode, the select signal is simply transmitted out to the pooling chain. The other units generate request signals when they are ready to transfer out data.

The pooling circuit 24 responds to request and select signal patterns to make priority selections internally within the pooling chain, and select the queuing order. The general arrangement of the pooling circuit 24 is shown in FIG. 2, with more specific details of the circuit being shown in FIG. 3 and described below. The parallel data bus from the key unit is coupled within the pooling circuit 24 to a serial to parallel converter 50 which functions bidirectionally to generate transitions representative of the successive bits in the data record. The converter 50 both converts parallel data received from the key unit 10 into serial data entered into the pooling circuit 24, and converts received serial data into its parallel equivalent for entry into the key unit 10.

Transmission of data along the pooling chain is accomplished by separate repeater circuits, here designated as the first repeater 52 and the second repeater 54, with the first repeater transferring the request (RQ) signal along the chain from the lower priority to higher priority units, together with data transmitted in the same path, and the second repeater 54 transferring select (SEL) signals and data in the opposite direction. At the input to the second repeater 54, the select signal that is provided is either the signal from the immediately higher prior unit, or the internally generated SEL signal from the control matrix 32 if the key unit is being employed as the central recorder. Each of the repeaters 52, 54 conditions and slightly delays the input signals, but by wave-shaping and retiming the signals there is no degradation in quality whatever the length of the chain, so that system reliability is not affected by interchange of units.

The generalized case, the first and second repeaters 52, 54 are disconnected from lower priority units and connected to the local data unit by switching systems 56, 58 respectively (shown as electromechanical switches solely for ease of visualization), these being controlled by priority selection circuits 60. Particularly with a substantial number of units, request signals will generally be transmitted from one or more units, and the switches 56, 58 will generally be in the bypass position shown. The priority selection circuits 60, however, are arranged so that an operative unit in the chain which is of higher priority does not transmit a request signal until the selection of another unit has terminated, at which time priority is established on the basis of the highest priority unit having a then existing request status. If that unit is the pooling circuit 24 shown, all lower priority units are disconnected from the chain and the request signal is transmitted to the central recorder.

Figure 3:
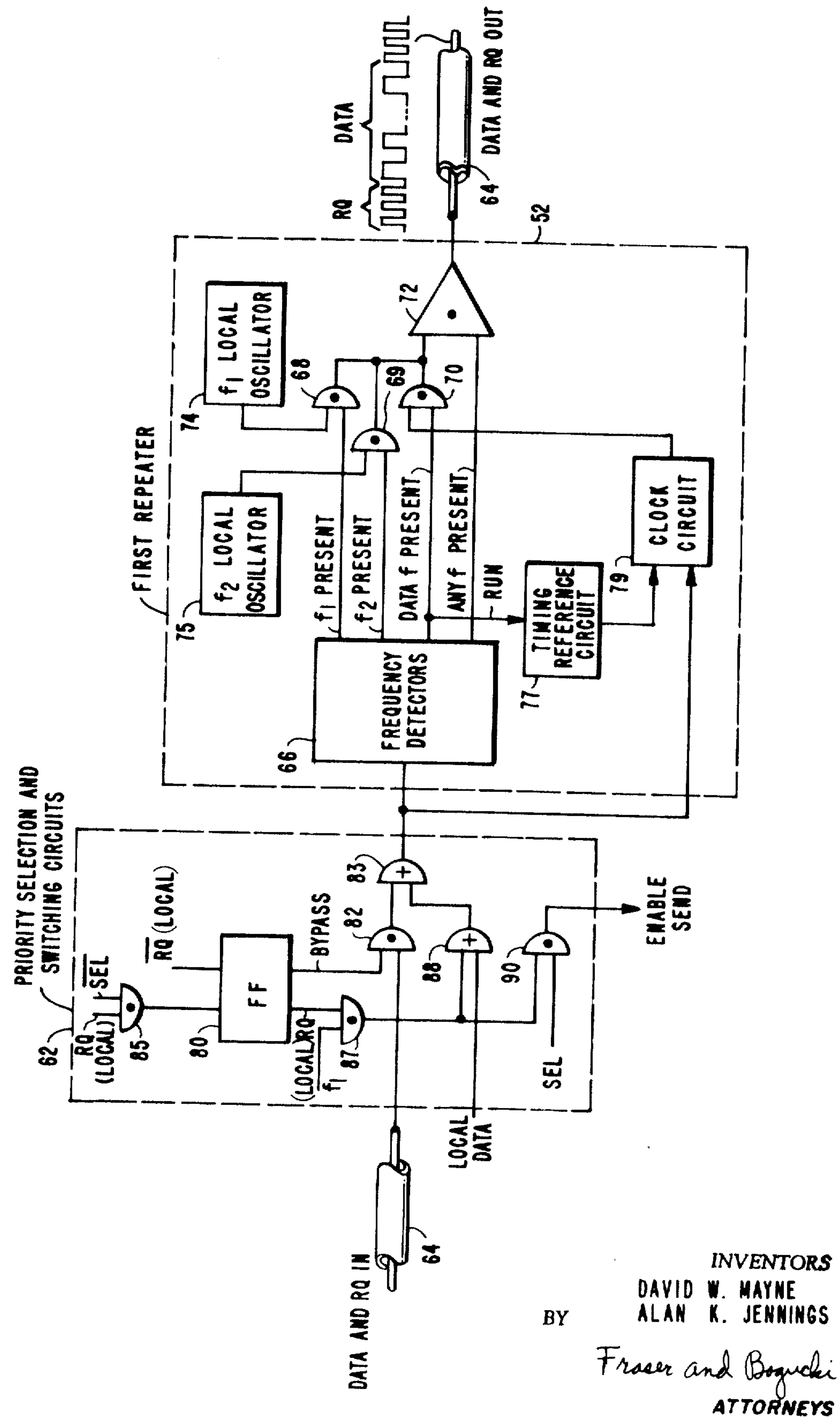
FIG. 3 is a combined schematic and block diagram representation of further details of a pooling circuit that may be utilized in the arrangements of FIGS. 1 and 2.

Further details of the pooling circuits are shown in FIG. 3, to which reference is now made. Only the first repeater 52 and the gating circuits 62 which comprise the priority selection and switching circuits are illustrated. Those skilled in the art will recognize that a number of the functions can be duplicated, such as self-clocking of the data signals, inasmuch as transmitted and returned data are not provided at the same time. To simplify the representation, however, the first repeater 52 and the associated priority selection and switching circuits 62 are shown in separate form. The input and output conductors into the pooling circuit comprise coaxial cables 64 for transferring rectangular waveforms at three different frequencies, with minimum attenuation and phase shift. The three frequencies are referred to herein as $f_1$, $f_2$ and the data frequency. Considering initially only the transfer of input data, the RQ signal may be provided at the $f_1$ frequency, here chosen as 2,560 kc., or 2.56 megahertz, with $f_2$ being 640 kc. and the data frequency being 160 kc. It will be observed that these frequencies vary by multiples of 4, these separate signals being detected in separate frequency detectors 66. Considering the bypass operation initially, data is preceded by signals at the RQ frequency ($f_1$), and followed by the same frequency. The signals are reconstituted, with slight delay in the data signals, by utilizing the outputs from the frequency detectors 66 to condition separate AND-gates 68, 69, 70 coupled to the input of an amplifier 72. The remaining inputs of the AND-gates 68, 69 are actuated by $f_1$ and $f_2$ local oscillators 74, 75, respectively. Thus, the input signal is reconstituted by being converted to enabling signals which then control the output of the locally generated frequencies. The same reconstitution occurs in the data, but inasmuch as the data has a time varying sequence, the data is reconstituted in a self-clocking circuit which may be any of a number of types utilized in data transmission systems and other systems for eliminating short-term phase variations in successive transitions of a signal provided at a selected frequency. In the example shown, the enabling signal indicative of the presence of the data frequency actuates a timing reference circuit 77, specifically, by gating out signals from a crystal-controlled oscillator stable at the data frequency rate within close limits over a substantially longer interval than that required for transmission of a data block. The timing reference circuit 77 thus provides stable reference transitions for a clock circuit 79, which utilizes these transitions in eliminating time variations in the directly applied data signals. Briefly, the transitions occurring in the stable reference signal may be delayed by approximately 3 microseconds relative to the nominal transition in the data signal. Transitions in the data signal are used to set and reset a flip-flop which conditions gates that are fully activated at precise times determined by the arrival of the reference signal transition. Thus, the data signal also is actually reconstituted by the self-clocking circuits, and additional wave shaping and amplification may be employed in the clock circuit 79 if desired. This output signal is also provided to the amplifier 72 through the AND-gate 70, the amplifier 72 being enabled by a signal from the frequency detector 66 that indicates that any frequency is present. Signals at the frequency levels chosen preserve their sharp transitions when transmitted through the RF line 64.

Gating of the various signals through the chain and the selection of priority are effectively accomplished within the priority selection and switching circuits 62, which receive the locally generated RQ signal, and the externally generated SEL signal, together with the local data and the input from the lower priority units in the pooling chain. If no local request is present, a flip-flop 80 conditions an AND-gate 82 with what may be termed a bypass signal, so that RF input from the pooling chain activates the AND-gate 82 to generate a rectangular wave output at the frequency then being transmitted. This is passed through an OR circuit 83 to the first repeater 52. The flip-flop 80 is switched to provide a local request, which indicates that the associated data input unit is requesting the line when the RQ signal from the data unit and the SEL signal concurrently exist to activate an AND-gate 85. As long as the SEL signal is present, the flip-flop will not be set to the state at which the local RQ signal is generated. The SEL signal is of course provided from the head unit in the chain through the second repeaters, not shown in FIG. 3. The SEL signal can be generated during the entire interval of selection until the data block is completed by coupling together the $f_2$ present and data frequency present signals and generating the SEL signal with an inverter, as one example. Once the flip-flop 80 is set to generate the local RQ signal, the $f_1$ signal passes through an AND-gate 87, an OR-gate 88 and the OR-gate 83 into the first repeater 52. When local data is provided, the $f_1$ signal is gated off, and the local data is passed through the OR-gate 88 into the first repeater 52. The local data is provided from the key unit in response to the provision of the SEL signal concurrently with the local RQ signal, to fully activate an AND-gate 90.

As noted above, only one frequency $f_1$, or $f_2$ need be employed at a given repeater, in conjunction with the data. The presence of two frequencies, however, permits considerably greater facility in automatic operation. In the first repeater chain, the $f_1$ signal can be used in conjunction with data requests, and the $f_2$ signal can be used in conjunction with program requests, with the opposite conditions applying at the second repeater. Whether data is transferred or programs are transferred, the pooling circuits 24 are seen to operate in precisely the same fashion, both in selecting priority and in shifting the command and data signals along the chain.

Figure 4:
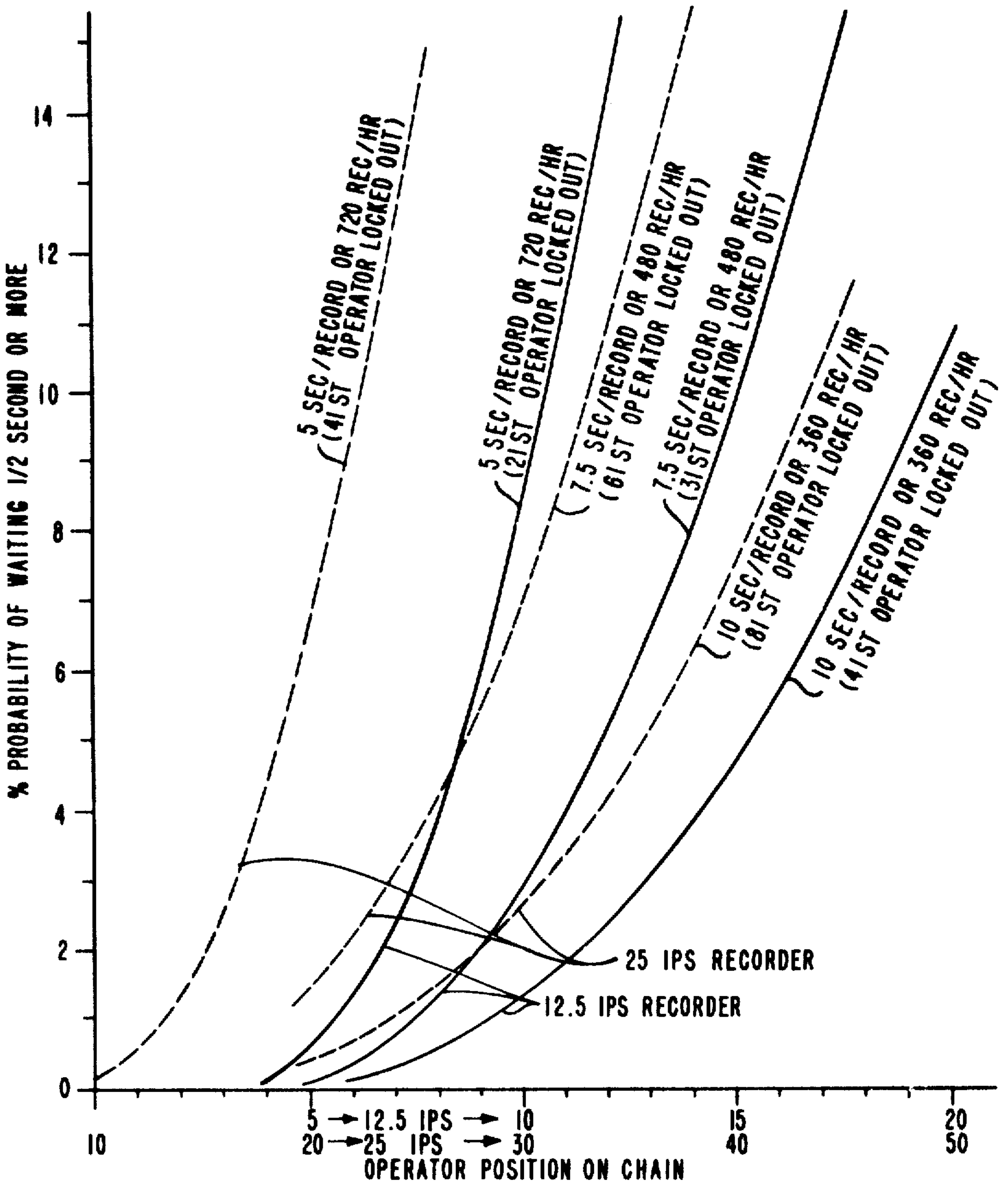
FIG. 4 is a graphical representation of priority position in a pooling chain versus probable operator delay times for various system configurations, useful in explaining the operation of systems in accordance with the invention.

To further understand the significance of this simplified queuing and priority system, reference may be made to FIG. 4. It should first be appreciated that the queuing system does not operate to assemble a sequence of messages, except in the sense that a number of requests placed online at the same time will be treated in the order of station priority, if no other requests occur in the meantime. At each instant in time, however, priority selection is based first upon priority status in the chain, for units that are ready to transfer data blocks. The highest priority units in the chain, therefore, constantly are free to interrupt the lower priority units, thus changing the priority relationship. The practical example of a system being described does not, however, in fact introduce any significant delay in operator access time to the central recorder. As previously noted, with approximately 8 to 10 seconds being required for a typical record, the transfer time requirements and the pooling chain position, together with the nature of the central recorder, determine the probable waiting time for a given operator in the chain. The graphical representation of FIG. 4 illustrates the statistical probability, in percentage, that a given operator in the chain, whose position is denoted along the abscissa, will be required to wait for more than ½ second, which is clearly an acceptable delay time. The curves presented are based on the use of 25 IPS recorder (shown in dashed lines) as against a 12.5 IPS recorder, as shown in solid lines. With the 12.5 IPS recorder, and the 10-second per record average entry time, the 20th operator in the chain has only approximately a 10 percent probability of waiting ½ second or more. With up to 10 operators in the chain there is less than 2 percent probability. On this basis, approximately the 41st operator is locked out, i.e. unable to gain access at any time. In comparison, with the 25 IPS recorder, and shifting to the lower reference scale on the abscissa, over 25 operators can be on line with a 10-second per record interval time before a 2 percent probability of an excess of one-half second wait exists.

These release times were calculated on the following general basis. It is assumed that each operator releases records to the pooling chain at the same uniform rate, and that once the channel is obtained it is kept busy for a fixed time in processing the record. Each station therefore causes the channel to be busy for a given proportion of the total time available. Each operator is assumed to release a new record at a random time (at random phases in time, even though at a uniform rate). It is further assumed that the number of stations is not near saturation, and that the waiting times are substantially less than the product of the total number of stations times the average cycle time to complete processing a record. The example also assumes relatively steady state conditions, i.e. the absence of a substantial backlog of requests that must be worked off.

Figure 5:
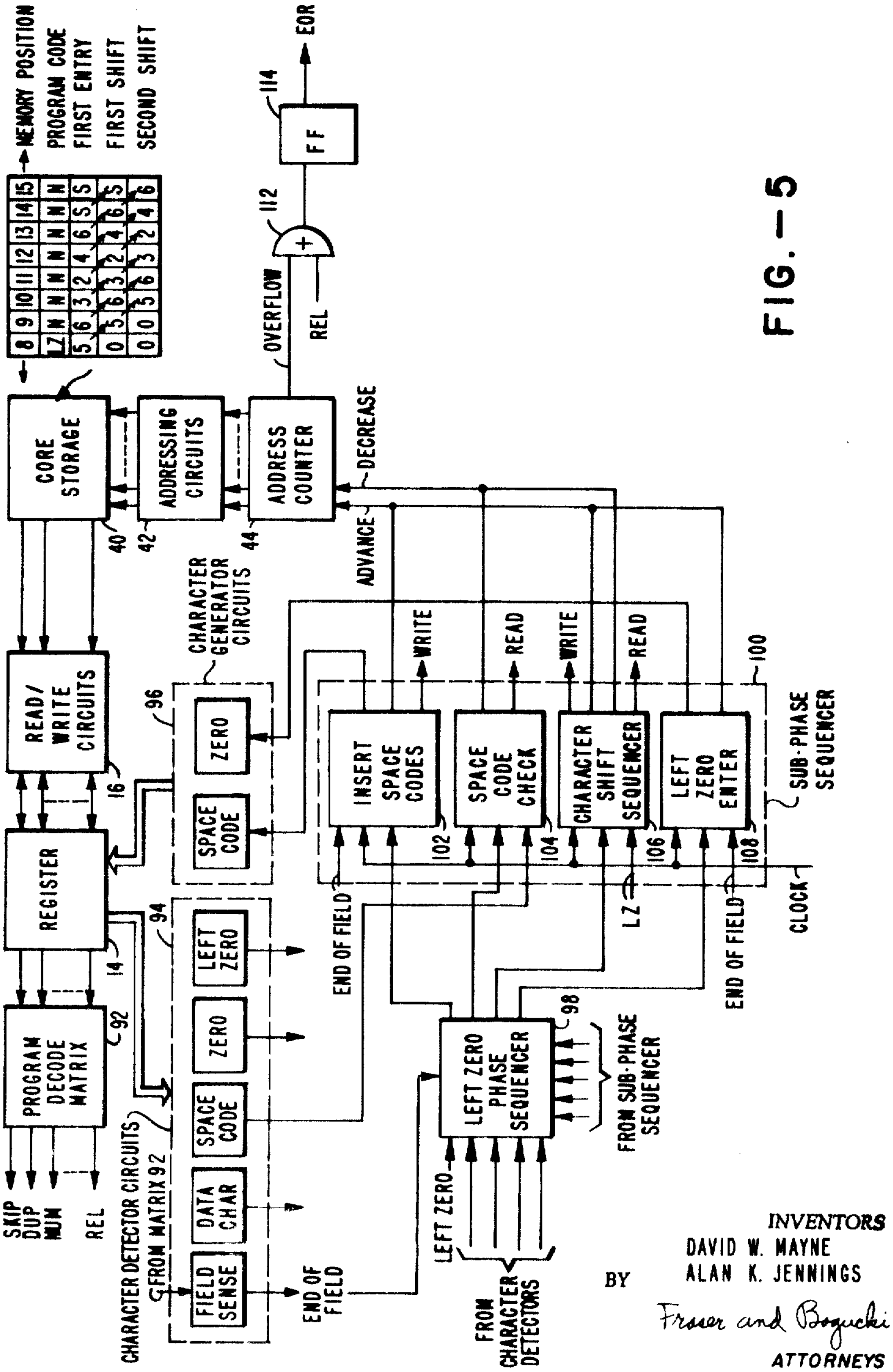
FIG. 5 is a block diagram of a left zero adjust and programmed record length control system in accordance with the invention; and, FIG. 6 is a block diagram of a circuit for providing program interchangeability in accordance with the invention.

The left zero and variable program length operations are accomplished by separate control circuits associated with the data and program memory 16, only the principal units of which have been illustrated in FIG. 5, to which reference is now made. A program decode matrix 92 generates individual signals representative of the varied available program codes, and character-detector circuits coupled to the register 14 as well as the matrix 92 detect the end of the field, whether the character being read is a data character or some other character, space code characters, which are used as temporary fillers in a field and carrying out the left zero function. At the particular times in the operation of the circuit, space codes or zeros are written into the memory from separate character generator circuits 96. It will be appreciated that decoding matrices are utilized in place of the circuits 94, 96, and that these matrices accomplish many other functions as well as the specific detection and signal generation described, but these elements have been extracted in order to provide a clear description. Similarly, the sequence and control circuits for the left zero function are in practice arranged as a subcontroller having a phase counter, a decode matrix, and separate subphase counters and matrices for carrying out particular internal functions in addition to those involved in the left zero operation. Similarly, the principal elements of the left zero system have been extracted and shown as a left zero phase sequencer 98 and a subphase sequencer 100 which comprise control circuits that operate the address counter 44 to advance or decrease the count in predetermined patterns, while also operating the read/write circuits 46. Separate units within the subphase sequencer have been designated by functional designations, such as the insert space code unit 102, the space code check unit 104, the character shift sequencer 106 and the left zero enter unit 108. The limited and repetitive functions provided by these units will be described in further detail hereafter in conjunction with the specific example of left zero operation.

The core storage 40 as previously described has 200 character positions, and in normal operation the address counter overflows when a count of 200 is reached, this overflow being directed through an OR-circuit 112 to set a flip-flop 114 which generates the end of record signal, and initiates the next phase of operation, such as the transfer of entered data to a data recorder. The release (REL) signal derived from the program decode matrix 92, however, may alternatively be utilized to generate the EOR signal, so that an REL code in a program position can effectively terminate a record.

In left zero operation, as shown in the example of a typical field from positions 8 through 15 in the core storage 40 (depicted adjacent to the core storage 40), data entry proceeds through a sequence of numeric data to a length which is less than the total available length of the field. The left zero program characters start with the left zero code (LZ), and thereafter designate numeric data (N). It is desired to justify the given number (563246) to the right-hand margin in the field, at position 15. With the left zero-phase sequencer 98 activated by the left zero signal, which may be program encoded as shown in the first position in the field and thereafter retained until the operator indicates that data entry for the field is being completed, the first phase entered is that of inserting space codes in the remaining positions (14 and 15) of the field. These space codes are filler codes which have no meaning. The insert space code unit 102 provides a write signal to the read/write circuits, and advances the counter 44 under control of the clock, while generating the space code in the generator circuits 96 so as to enter this character into positions 14 and 15 of the memory. The end of the field is established by the character detector circuits 94, when the program character for the start of the next field is identified, at which point the space code entry is terminated. The end of field indication is returned to the left zero-phase sequencer 98 to then initiate the next subsequence, in which the right end character in the data block is located by decreasing the counter 44 one step to read the character at position 15. If this is a space code, the phase sequencer 98 activates the character shift sequencer 106 to in effect shift each data and space code character by one position to the right in the memory, eliminating the right-end space code. Starting with the right-hand numeral (6) in position 13, therefore, this position is read into the register 14, the address counter is advanced one position and the character is then written in at position 14 of the memory. Then the address counter 44 is caused to decrement two counts to position 12 to write in the next character (4) in the memory at position 13. This sequence is continued until the LZ at the start of the field is detected, at which point a zero is entered at the left-hand end of the field by the left zero-enter unit 108, activated in its turn by the left zero-phase sequencer 98. After entry of the zero, the counter 44 is advanced by the left zero-enter unit 108 until the first character of the next field in the memory is again being addressed. The system then again commences a shift operation, by again activating the space code check unit 104, and then the character-shift sequencer 106 if a space code is present, as it is in this example. At the completion of entry of the next left zero by the unit 108, the system has completed the left zero operation. The operation is terminated when the absence of a space code is thereafter sensed by the unit 104.

This arrangement of the left zero control requires no modification of the memory system, and is independent of the length of the field across which left zero adjustment may be desired. It is also independent of the relative length of entered data within the field, in comparison to the total length of the field. The operation is preferably begun by the use of the left zero key after sensing of the left zero code in the program storage, to insure against inadvertent or other improper initiation. The individual repetitive sequences are dependent either upon fixed numbers of advance and decrease count pulses, or upon the detection of particular codes, so that specific exemplifications of the circuits have not been included inasmuch as they will be evident to those skilled in the art.

The same arrangement permits programmed record length to be achieved, by virtue of the incorporation of the release code in the program. When a program is transferred from an external source into the memory, or a new program is written, the end of record code can be entered anywhere between the 20-character minimum (imposed only by minimum record length considerations for associated data-processing systems) and a maximum available number of characters of 200 in this particular example. Each of the two available programs can be of a selected and different length, and the employment of this programming feature saves both operator time and conserves record length on the tape.

Figure 6:
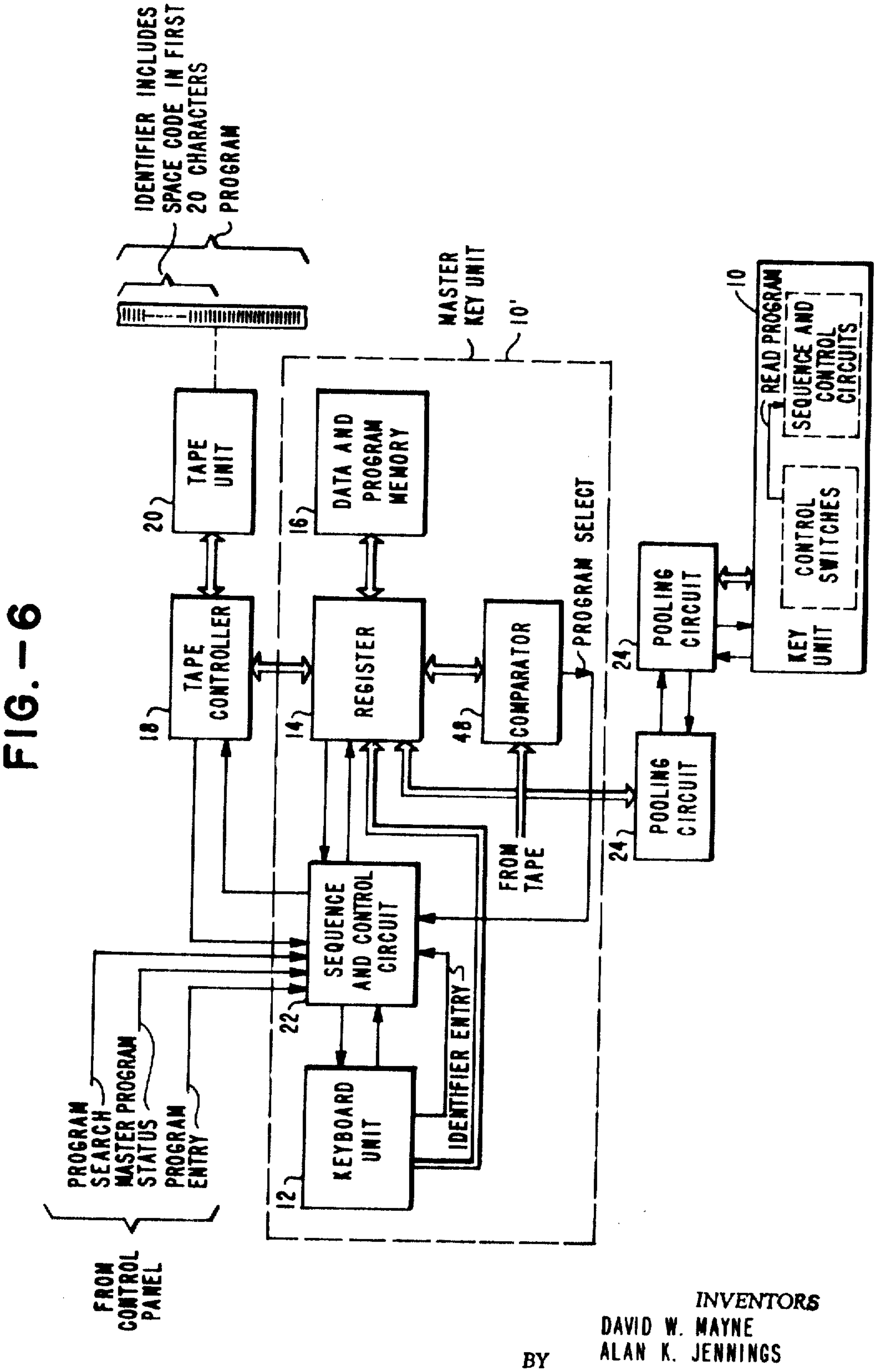

The manner in which this system operates to transfer programs along the pooling chain in a fashion like the transfer of data has previously been described. No internal modifications are needed in the units, except for selection of settings on the control panels representative of the status of the central recorder, here shown as a master key unit and designated 10' for convenience, and the individual key unit 10 that is in the pooling chain. The diagram of FIG. 6, to which reference is now made, corresponds to the diagrams of FIGS. 1 and 2 and the units are similarly designated, except that those functional portions of the system that are significant in terms of the program entry and interchange functions have been separately designated.

As far as the master key unit 10' is concerned, an individual operator may actuate the control panel switch to establish the program entry mode, so that a program may be entered from the keyboard unit directly into the memory, for subsequent control in data entry. This option is also available at the key unit 10, although it is ordinarily preferred not to permit individual operators to have the capability of changing programs.

In a second mode of operation of the master key unit 10' therefore involves master program transfer, in which the stored program is to be made available from the memory to the pooling chain, in a fashion identically corresponding to the transfer of data blocks. The master program status is selected at the control panel of the master key unit 10', while at the individual key units 10, the operators select the control switches to request master program. The individual key units 10 are thereafter serviced in accordance with their priority status, with data being entered into the program portion of the memory instead of the data portion.

Manually entered programs at the master key unit 10' or the two programs available from local memory are not sufficient for the wide variety of functions that may have to be undertaken. A program tape may therefore be put on the tape unit 20, this program tape containing a substantial number of programs, each identified by a particular identifier portion, the identifier portion having at least one space code in the first 20 characters thereof to provide a unique distinction between identifier and program blocks. The tape controller 18 may be arranged to incorporate a search system providing bidirectional operation of the tape, with high speed scan. For present purposes, however, it is assumed that the tape controller is started (by operation of the search mode switch selected at the control panel), with the tape at the BOT tape marker, and that it simply scans through the identifier blocks and their associated programs in the forward direction, with data being compared on a character-by-character basis at the comparator, which received data both from successive positions in the memory 16 through the register 14, and the identifier characters from the tape unit 20. Once the identifier is recognized, a program select signal is returned to the sequence and control circuit 22, and the next block on tape (the program block) is entered directly into the program portion of the memory 16. Once located in the memory, the program may be used internally or transferred along the pooling chain as previously described.

Although various forms of input data preparation systems and particular aspects of those systems have been described, it will be appreciated that a number of other variations and modifications are feasible within the scope of the invention as defined by the appended claims.

What is claimed is:

1. A pooling circuit that may be serially connected with other similar units to provide queuing of data blocks provided from separate data input systems, each providing request signals to indicate the availability of a data block and operating to transfer data in response to a select signal that is provided thereto, said pooling circuit comprising:

at least one signal repeater coupled to receive input signals along the series and to provide reconstituted signals to the next unit in the chain, and priority selection means including switching means in the coupling to the signal repeater, and coupled to receive the request and select signals, said switching means coupling input signals and request signals from the coupled data input system into the chain, said priority selection means responding to request and select signals to enable the transfer of data from the coupled data input system when a select signal is present and no lower priority unit has provided a prior request signal, said switching means disconnecting all lower priority units from the chain when said priority selection means enables the transfer of data.

2. The invention as set forth in claim 1 above, wherein said pooling circuit comprises a pair of signal repeaters, one transferring data between lower priority and higher priority units and the other transferring data between higher priority units and lower priority units.

3. The invention as set forth in claim 2 above, wherein each pooling circuit is coupled to transfer data characters in parallel by bit form to and from the associated data input system, and wherein each pooling circuit additionally includes bidirectional parallel to serial converter means coupling the associated data input system to the signal repeaters therein.

4. The invention as set forth in claim 3 above, wherein the data signals are transferred serially at a selected frequency, and wherein the request and transmit signals are transferred at frequencies that are selected multiples relative to the data signal frequency, and wherein said signal repeaters include local frequency generator means, operating at the selected frequencies of the request and select signal, frequency-detecting means responsive to the frequencies of the request and select signals, and gating means responsive to the detection of the selected frequencies and coupled to pass the locally generated frequencies as output from the signal repeater in response thereto.

5. The invention as set forth in claim 4 above, wherein such signal repeaters include reference-timing means operating at the frequency of the data signals for generating a stable-timing reference signal, and means responsive to the presence of the data frequency and responsive to the data signal, and the stable-timing reference signal, for regenerating the data signal with respect to the stable-timing reference, said means being coupled to the output of said repeater.

6. A pooling circuit module for transferring command signals and data blocks from an associated individual data input unit along a queuing chain of variable length formed with other like pooling circuits arranged in priority sequence, comprising:

bidirectional signal repeater means, including means for detecting selected different signal frequencies, local signal-generating means operating at the selected frequencies, and signal-gating means responsive to the means for detecting and the local frequency-generating means for reconstituting each detected signal;

digital priority selection means responsive to command signals and data signals transferred along the queuing chain for controlling operation of the pooling circuit as a data transfer unit or a signal repeater;

and means responsive to said digital priority selection means and data signals from the associated data input unit for controlling the signal-gating means of said signal repeater means to transfer command signals and data signals along the pooling chain.

7. The invention as set forth in claim 6 above, wherein the individual units provide data signals and command signals in parallel, and wherein in addition the pooling circuit module includes means responsive to the data signals from data input unit for generating serial data pulse trains at a frequency different from the selected frequencies, and said signal repeater means includes means for reconstituting the data signal.

8. The invention as set forth in claim 6 above, wherein the signals at different selected frequencies comprise rectangular waveforms, and wherein the system in addition includes a pair of RF signal-coupling lines between each adjacent pooling circuit pair in the chain, and means for transferring the data signals at a selected frequency.

9. The invention as set forth in claim 8 above, in which the data input unit provides a request signal as a command signal, and in which a select signal is provided as a different command signal, and wherein said signal repeater means comprises a pair of signal repeaters, a first generating a request signal of a first selected frequency and the second generating a select signal at a different selected frequency, both of said frequencies differing from the data frequency, and wherein request signal is transferred along the queuing chain in order of ascending priority and said select signal frequency is transferred along the second repeater chain in order of descending priority.

10. The invention as set forth in claim 9 above, wherein the request and select signals differ from the data frequency by multiples of 4, and wherein each pooling circuit includes bidirectional parallel to serial converter means coupled to both of said repeaters, for transferring parallel characters to and from the associated data input system, and for transferring data characters along the first of the repeater chains and receiving returned data characters from the second of the repeater chains.

11. An input data preparation system for entry of data in computer-compatible form from a variable number of different data input systems comprising:

at least two data input systems means, each including means for storage of a block of data comprising multiple characters, means for output transfer of the block of data with the characters being in parallel bit form, and means providing signals indicating the availability of a data block for transfer;

data-processing means including storage means coupled to receive blocks of data as output transfers, and means for providing a signal to select data transfer;

at least three pooling circuit means coupled in series, each of two being coupled to a different one of said data input system means, each of said two pooling circuit means including parallel to serial converter means and means for generating said data signals as serial signals at a selected RF frequency, means for transferring blocks of data from each data system means bidirectionally along the series between said data-processing means and the individual data input system means, the third pooling circuit means including serial to parallel converter means, each of said two pooling circuit means being responsive to said signals indicating the availability of a data block for transfer and said signal to select data transfer, to effect transfer in accordance with the highest priority position indicating availability when a signal to select data transfer is provided, thereby providing a queuing system, said pooling circuit means also including means for transferring signals indicating availability as RF signals at a frequency different from the selected frequency.

12. An input data preparation system for generation of a single computer-compatible record from a selectable number of data input systems comprising:

a least two data input systems, each including storage means for a data block; and means for providing the characters of the data block in parallel bit form as output in response to a command;

at least two pooling circuit means, each including serial to parallel converter means coupled to an individual data input system, and signal repeater and signal disconnect means, each pooling circuit further including RF coupling means for coupling to both higher and lower priority pooling circuit means in a series chain and means for reconstituting both data blocks and command signals at different frequencies coupled to said RF coupling means, the signal repeater and signal disconnect means being coupled to transfer both data blocks and control signals bidirectionally between the higher and lower priority pooling circuit means, and disconnecting all lower priority pooling circuit means when transferring from the associated data input system;

and computer-compatible recording means coupled to the highest priority pooling circuit means.

* * * * *

PO-1050
(5/69)

UNITED STATES PATENT OFFICE
CERTIFICATE OF CORRECTION

Patent No. 3,623,002 Dated November 23, 1971

Inventor(s) David W. Mayne et al

It is certified that error appears in the above-identified patent and that said Letters Patent are hereby corrected as shown below:

In the Abstract, line 2, "Blocks" should read --blocks--; line 11, after "command" and before "data" insert --and--; line 13, "treansferred" should read --transferred--. Column 3, line 64, delete "as" (second occurrence) and insert --a--. Column 5, line 28, after "tape enable" and before "or" insert --or between keyboard enable and tape enable--. Column 6, line 4, "13the" should read --13th--. Column 13, line 28, "signal" should read --signals--. Column 14, line 9, "a" should read --at--; line 10, after "block" and before "and" delete the semicolon (";") and insert a comma (--,--).

Signed and sealed this 19th day of September 1972.

(SEAL)
Attest:

EDWARD M.FLETCHER,JR.
Attesting Officer

ROBERT GOTTSCHALK
Commissioner of Patents